United States Patent [19]

Neri et al.

[11] Patent Number: 5,462,984
[45] Date of Patent: Oct. 31, 1995

[54] SOLID BLENDS OF STABILIZERS FOR POLYMERS

[75] Inventors: Carlo Neri, San Donato Milanese; Silvestro Costanzi, Lodi Vecchio; Mariangela Angaroni, Gerenzano, all of Italy

[73] Assignee: Enichem Synthesis S.p.A., Milan, Italy

[21] Appl. No.: 394,195

[22] Filed: Feb. 24, 1995

Related U.S. Application Data

[63] Continuation of Ser. No. 72,270, Jun. 3, 1993, abandoned.

[30] Foreign Application Priority Data

Jun. 4, 1992 [IT] Italy .................................. MI92A1376

[51] Int. Cl.⁶ .................................................. C08K 5/3435
[52] U.S. Cl. ................................ 524/102; 524/1; 524/99; 252/400.31
[58] Field of Search ................................ 524/1, 99, 102; 252/400.31

[56] References Cited

U.S. PATENT DOCUMENTS

| | | | |
|---|---|---|---|
| 4,177,186 | 12/1979 | Rody et al. | 524/102 |
| 4,210,578 | 7/1980 | Rody et al. | 524/102 |
| 4,778,838 | 10/1988 | Greco et al. | 524/102 |
| 4,946,880 | 8/1990 | Costanzi et al. | 524/96 |
| 4,952,619 | 8/1990 | Greco et al. | 524/96 |
| 5,051,458 | 9/1991 | Costanzi et al. | 524/99 |

FOREIGN PATENT DOCUMENTS 0491659  12/1991  European Pat. Off. .

*Primary Examiner*—Kriellion S. Morgan
*Attorney, Agent, or Firm*—Rogers & Wells

[57] ABSTRACT

Solid stabilizers for polymers comprises a blend of (a) organic polymer and (b) at least one silicon-containing compound having a sterically hindered amine group in the molecule in quantities of between 40% and 50% by weight of the final solid blend.

14 Claims, No Drawings

SOLID BLENDS OF STABILIZERS FOR POLYMERS

This is a continuation of application Ser. No. 08/072,270, filed Jun. 3, 1993, now abandoned, entitled SOLID BLENDS OF STABILIZERS FOR POLYMERS.

The present invention relates to solid stabilizers for polymers.

More specifically the present invention relates to solid stabilizers for polymers comprising an organic polymer and at least one silicon-containing compound having a sterically hindered amine group in the molecule, the procedures for their preparation and the polymeric compositions stabilized therewith.

It is known that polymers are subject to degradation over a period of time due to exposure to atmospheric agents, in particular due to the action of ultraviolet rays. In addition they easily degrade during operating and transformation processes owing to the high temperatures reached.

This degradation is reflected in a deterioration of the physical characteristics of the polymers, such as, for example, a decrease in the breaking load and flexibility, which are accompanied by a variation in the viscosity index or, in the case of transparent polymers, in alterations of the optical properties of the end-product.

To prevent this degradation it is customary to introduce stabilizing compounds into the polymer which are compatible with the polymer.

Compounds widely used for this purpose are those containing a sterically hindered amine group linked to a silicon function such as those, for example, described in Italian Patents No. 1.209.543, 1.197.491 and 1.218.004 filed by the applicant.

Among the compounds described in the known art, special importance is given to stabilizers to ultraviolet (UV) rays known under the trade-name of UVASIL of EniChem Synthesis.

UVASIL are generally blends of the cyclic products, having general formula (I), and linear products having general formula (II):

$$\left[ \begin{array}{cc} \underset{|}{\text{CH}_3} & \underset{|}{\text{CH}_3} \\ (\text{Si}-\text{O})_{\overline{n}} & (\text{Si}-\text{O})_{\overline{m}} \\ | & | \\ \text{R} & \text{R}'' \end{array} \right] \quad \text{(I)}$$

$$\text{R}'-\text{O}-\underset{\underset{\text{R}}{|}}{\overset{\overset{\text{CH}_3}{|}}{\text{Si}}}-\text{O})_{\overline{n}}-\underset{\underset{\text{R}''}{\backslash}}{\overset{\overset{\text{CH}_3}{\diagup}}{\text{Si}}}-\text{O})_{\overline{m}}-\text{R}' \quad \text{(II)}$$

wherein:
R is a group having general formula (III):

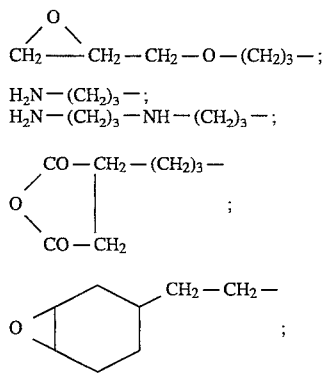

wherein
$R'''$ is a hydrogen or methyl atom;
$R^{IV}$ is a hydrogen atom or a $C_1$–$C_5$ alkyl radical, linear or branched;

R' is a hydrogen atom, a group having general formula (IV):

or a $C_1$–$C_{12}$ alkyl radical, linear or branched;
R" is a $C_1$–$C_{18}$ alkyl radical, linear or branched, or one of the following radicals:

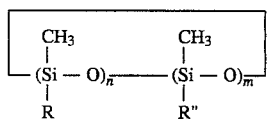

$H_2N-(CH_2)_3-$ ;
$H_2N-(CH_2)_3-NH-(CH_2)_3-$ ;

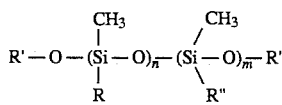

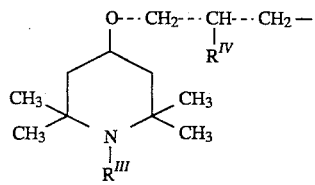

m+n have a value of between 4 and 50;
m is 0 or an integer between 1 and 15.

General formulae (I) and (II) are generally present inside the stabilizing compound in relative quantities which vary according to the molecular weight to be obtained.

UVASIL are viscous liquids, most of which are mixable with organic solvents and, as such, can be added to the polymer in the various phases of the transformation process in quantities of between 0.05% and 1% by weight with respect to the weight of the polymer to be stabilized. However this physical form is not always met with the approval of the market which is accustomed to operating with solid products.

UVASIL can be fixed to a solid support containing surface hydroxylic groups and transformed into powders. Supports which are suitable for the purpose are siliceous materials, of both natural and synthetic origin, such as diatomaceous earth, celite, silica gel, cement, glass and silicon-aluminates in general. The quantity of additive chemically bound to the support generally never exceeds 30% by weight with respect to the finished product.

In addition, solid products can be obtained by the absorption of liquid products on fumed silica, in which case it has been possible to obtain a solid compound containing the liquid product in quantities of up to 10 times the weight of fumed silica. The solid products thus obtained, however, are not completely powderless and cannot be thoroughly mixed with the polymer to be stabilized.

The applicant has now found that solid blends of stabilizers for polymers which do not have the disadvantages of the known art, can be obtained by mixing under heat the above liquid siliconic stabilizers with a polymer.

The present invention therefore relates to solid blends of stabilizers for polymers comprising an organic polymer and at least one siliconic compound having a sterically hindered amine group in the molecule in a quantity of between 40% and 90% by weight of the final solid blend.

The solid stabilizers of the present invention are easier to use, from a commercial point of view, than normal liquid stabilizers. In addition, as they can have the required physical form, they guarantee a homogeneous dispersion in the polymer to be stabilized during the production of the end-product.

The above solid stabilizers are also powderless and are consequently not dangerous for the health of the operators and there is no risk of explosion.

Siliconic compounds which are suitable for the purposes of the present invention are those composed of a blend of cyclic and linear products having the following general formulae (V) and (VI):

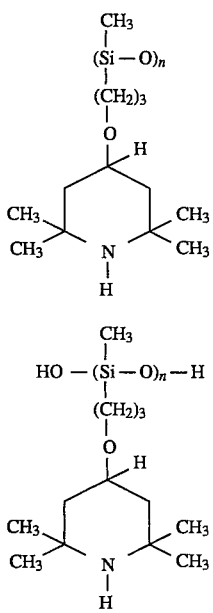

with an average molecular weight of between 1100 and 10000 Dalton.

The percentage of stabilizing additive contained in the solid stabilizer of the present invention depends on the kind of polymer used and on its molecular weight and also on the molecular weight of the additive used and percentage of cyclic products having general formula (V) contained in the additive.

In fact, stabilizing additives containing a percentage, with respect to the total, of cyclic products with general formula (V) higher than 85%, can be added to the polymer in a higher percentage than those with a higher concentration of linear products having general formula (VI).

Stabilizing additives which can be used are UVASIL 299 LM and UVASIL 299 LM of EniChem Synthesis, which, compared to UVASIL 299, contains a higher percentage of cyclic products with general formula (V).

Examples of polymers which are particularly suitable for the purposes of the present invention are olefinic polymers such as, for example, polypropylene, low and high density polyethylene, low density linear polyethylene, polybutylene, polystyrene, etc.

For example, using a polymer polypropylene of the type Moplen FLD 50S of Montedison having a MFI of 0.4 g/10' and a density of 0.9 g/cc, it is possible to obtain a concentration solution containing a quantity of UVASIL 299 LM of up to nine times the weight of the polymer.

Using atactic polypropylene, it is possible to obtain a concentrated solution compared of 50% of polymer and 50% of UVASIL 299 LM.

The solid stabilizers of stabilizers for polymers thus obtained, are reduced to flakes, granules or powders depending on the intended use and they generally have a waxy or rubbery appearance, are not very greasy to touch and have a good flowability.

A procedure for the preparation of the solid stabilizers of stabilizers of the present invention consists in charging the components into a reactor in the desired quantities, bringing the blend to melting point to a temperature of between 170° C. and 280° C. keeping it under stirring for a time which is necessary to ensure complete homogenization which is between 10 and 120 minutes, generally 30 minutes and, subsequently, percolating the blend on a cold roll and reducing it to the required physical form.

A second procedure consists in dissolving the components in a solvent such as, for example, toluene, heptane, chloroform, etc., and subsequently removing the solvent under vacuum at a temperature of between 100° C. and 120° C. and a pressure of 0.1 torr. The solid blend thus obtained in ground until a powder is obtained.

A further procedure consists in feeding the components of the blend in the desired quantities into an extruder in two different screw steps. The extruded blend is then cut into pellets.

The above procedures can be used to obtain solid blends containing all the combinations of additives in the proportions normally utilized in the practical use for the transformation of polymers.

More specifically, the present invention also relates to the fact that the solid stabilizers described above, can act as carriers for one or more of the following polymeric additives:

primary thermal stabilizers such as, for example, those based on 2,6-diterbutylphenol, etc;

secondary thermal stabilizers such as, for example, products based on phosphorous (phosphites or phosphonites), etc.;

other UV stabilizers such as, for example, organic complexes of nichel, compounds based on hydroxybenzotriazoles, compounds based on hydroxybenzophenones, compounds based on sterically hindered amines, etc.;

lubricants such as, for example, calcium or zinc stearates, amides, phthalates, etc.;

finely sub-divided inorganic pigments;

organic dyes.

According to one embodiment, solid stabilizers with several components can be obtained with one of the above procedures.

According to another embodiment, solid stabilizers with several components can be obtained by melting the solid blend containing the polymer and at least one silicon-containing compound having a sterically hindered amine group in the molecule and subsequently adding the above additives to this in the desired quantities.

The above procedures are characterized by the fact that there is no chemical reaction between the polymer and the silicon-containing compound having a sterically hindered amine group in the molecule and, in the case of solid stabilizers with several components, also between the other additives and the polymer. In fact, by extracting the solid product thus obtained in soxhlet with a suitable solvent such as hexane, heptane, chloroform, etc., the additives can be recovered with quantitative yields.

After extraction, the polymer used, upon microscopic observation, seems to be composed of communicating microcells, whose dimensions vary according to the thermal process to which the blend has been subjected during the cooling phase.

For example, following a rapid lowering of the temperature of the blend from the operating temperature down to 100° C.–120° C., after the extraction of the additive, micropores are observed with a more contained dimension than those observed after a slow lowering of the temperature.

The polymers, after extraction, suitably treated to eliminate the air contained in the pores, are capable of re-absorbing the same quantity of additive which they contained previously.

The solid stabilizers obtained according to the procedures of the present invention can be suitable diluted with the polymer to obtain a final concentration of the additive in the polymer which varies from 0.05% to 1% by weight of the weight of the 0.5%. polymer to be stabilized, and preferably from 0.1% to The following examples which are illustrative but not restricting, provide a better understanding of the possible embodiments of the present invention.

EXAMPLE 1

70 parts of UVASIL 299 LM (composed of 90% by weight of a cyclic component, with an average osmometry molecular weight of 1100 Da and a density of 1.02 g/cc) and 30 parts of polypropylene (Moplen FLF 20 of Montedison, with a MFI of 12 g/10 and a density of 0.9 g/cc) are charged into a reactor equipped with a stirrer.

The blend is brought to a temperature of 190° C,. and is kept at this temperature for about 30 minutes.

The blend is then discharged from the reactor onto an aluminium sheet and left to cool to room temperature.

The solid blend thus obtained, having a waxy appearance, can be reduced to powder by grinding at a low speed.

The powder is resistant to the pressure and does not show clogging on prolonged storage (about 30 days) at a temperature of 40° C.–50° C.

EXAMPLE 2

80 parts of UVASIL 299 LM and 20 parts of the polypropylene (Moplen FLF 20 of Montedison, with a MFI of 12 g/10 and a density of 0.9 g/cc) are charged into a reactor equipped with a stirrer.

The blend is brought to a temperature of 190° C. and is left under stirring for a period sufficient to form a continuous phase, generally between 30 and 60 minutes.

The blend is then discharged from the reactor onto an aluminium sheet and left to cool to room temperature.

The solid blend thus obtained is greasy to the touch.

EXAMPLE 3

80 parts of UVASIL 299 LM and 20 parts of polypropylene (Moplen FLX 30S of Montedison, with a MFI of 9 g/10 and a density of 0.9 g/cc) are charged into a reactor equipped with a stirrer.

The blend is brought to a temperature of 200° C. and is left under stirring for about 60 minutes.

The blend is then discharged from the reactor onto an aluminium sheet and left to cool to room temperature.

The solid blend thus obtained has a waxy appearance and is not very greasy to the touch.

EXAMPLE 4

90 parts of UVASIL 299 LM and 10 parts of polypropylene (Moplan FLD 50S of Montedison, with a MFI of 0.37 g/10 and a density of 0.9 g/cc) are charged into a reactor equipped with a stirrer.

The blend is brought to a temperature of 230° C. and is left under stirring for about 30 minutes.

The blend is then discharged from the reactor onto an aluminium sheet and left to cool to room temperature.

The solid blend thus obtained has a waxy appearance and is not very greasy to the touch.

EXAMPLE 5

50 parts of UVASIL 299 LM and 50 parts of atactic polypropylene are charged into a reactor equipped with a stirrer.

The blend is brought to a temperature of 180° C., is left under stirring for 10 minutes and is then discharged from the reactor onto an aluminium sheet and left to cool to room temperature.

The solid blend thus obtained has a rubbery appearance and is not very greasy to the touch.

EXAMPLE 6

70 parts of UVASIL 299 LM and 30 parts of polypropylene (Moplen FLT 30S of Montedison, with a MFI of 2.9 g/10' and a density of 0.9 g/cc) are charged into a reactor equipped with a stirrer.

The blend is brought to a temperature of 190° C., is left under stirring for about two hours and is then discharged from the reactor onto an aluminium sheet and left to cool to room temperature.

The solid blend thus obtained has a waxy appearance.

EXAMPLE 7

A solution composed of 40 parts of low density linear polyethylene (Eraclear FP 180 of EniChem Polimeri, with a MFI of 1 g/10' and a density of 0.923 g/cc) and 80 parts of toluene are charged into a reactor equipped with a stirrer. A solution composed of 60 parts of UVASIL 299 LM and 60 parts of toluene are then added.

The blend is gently heated to 70° C.–80° C. and the toluene is completely eliminated under vacuum up to a pressure of 1 torr.

The residuous product is recovered and ground. The powder thus obtained is greasy to the touch.

EXAMPLE 8

Using the same procedure described in example 7, a product was obtained containing 65 parts of UVASIL 299 LM and 35 parts of modified EVA polyethylene (Riblene D-EVA DV 2025 of EniChem Polimeri, with a MFI of 0.35 g/10', a density of 0.925 g/cc, containing 3% of vinyl acetate).

The solid blend thus obtained has a rubbery appearance but is not greasy to the touch owing to the discharge of oil.

EXAMPLE 9

Using the same procedure described in example 7, a solid product was obtained containing 50 parts of UVASIL 299 LM and 50 parts of low density polyethylene (Riblene ZF 2200 of EniChem Polimeri, with a MFI of 0.23 g/10' and a density of 0.922 g/cc).

EXAMPLE 10

65 parts of UVASIL 299 LM and 35 parts of high density polyethylene (Eraclene HZB 6015 F of EniChem Polimeri, with a MFI of 0.3 g/10' and a density of 0.96 g/cc) are charged into a reactor equipped with a stirrer.

The blend is brought to a temperature of 250° C., is left under stirring for about 20 minutes and then discharged from the reactor onto an aluminium sheet and left to cool to room temperature.

The solid blend thus obtained has a waxy appearance and has a softening temperature of about 120° C.– 130° C.

EXAMPLE 11

60 parts of UVASIL 299 LM and 40 parts of high density polyethylene (Eraclene HDG 6015 of EniChem Polimeri, with a MFI of 11 g/10' and a density of 0.96 g/cc) are charged into a reactor equipped with a stirrer.

The blend is brought to a temperature of 250° C., is left under stirring for about 20 minutes and then discharged from the reactor onto an aluminium sheet and left to cool to room temperature.

The solid blend thus obtained has a waxy appearance and has a softening temperature of about 120° C.– 130° C.

EXAMPLES 12–18

Using the same procedure described in examples 1–7, blends are prepared containing polypropylene (PP Moplen FLF 20 of Montedison, with a MFI of 12 g/10' and a density of 0.9 g/cc), UVASIL 299 LM and a second stabilizing additive for polymers selected from the additives normally used in the art.

The quantities of the components of the blend are shown in Table 1. These quantities are the maximum which can be reached to obtain a flowing solid blend which is not greasy. The quantity of the second additive is generally about five times less than the quantity of UVASIL 299 LM present in the blend.

TABLE 1

| Ex | PP % | UVASIL 299 LM % | Second Additive (S.A.) | S.A. (%) |
|----|------|-----------------|------------------------|----------|
| 12 | 20 | 65 | Tris(2,4-diterbutylphenyl) phosphite | 15 |
| 13 | 24 | 57 | Ultranox 626 | 19 |
| 14 | 20 | 60 | Pentaerythrityltetrakis(3,5-diterbutyl-4-hydroxyphenyl) propionate | 20 |
| 15 | 20 | 60 | 2(2'-hydroxy-3',5'-diterbutylphenyl)-5-chlorobenzotriazole | 20 |
| 16 | 12 | 63 | bis(2,2,6,6-tetramethylpiperidinyl) sebacate | 25 |
| 17 | 30 | 52 | Ca-stearate | 18 |
| 18 | 20 | 60 | 2-hydroxy-4-octoxybenzophenone | 20 |

EXAMPLES 19–21

Using the same procedure described in examples 1–7, blends are prepared containing polypropylene (PP Moplen FLF 20 of Montedison, with a MFI of 12 g/10' and a density of 0.9 g/cc), UVASIL 299 LM and other two stabilizing additives for polymers selected from the additives normally used in the art.

The quantities of the components of the blend are shown in Table 2. These quantities are the maximum which can be reached to obtain a flowing solid blend which is not greasy.

TABLE 2

| Ex | PP % | UVASIL 299 LM % | Other additives (A.A.) | A.A (%) |
|----|------|-----------------|------------------------|---------|
| 19 | 20 | 60 | Tris(2,2,6,6-tetramethylpiperidinyl)sebacate | 10 |
|    |    |    | Tris(2,4-diterbutylphenyl) phosphite | 10 |
| 20 | 20 | 60 | Tris(2,4-diterbutylphenyl) phosphite | 10 |
|    |    |    | Pentaerythrityltetrakis(3,5-diterbutyl-4-hydroxyphenyl)propionate | 10 |
| 21 | 14 | 52 | Tris(2,4-diterbutylphenyl) phosphite | 7 |
|    |    |    | Pentaerythrityltetrakis(3,5-diterbutyl-4-hydroxyphenyl)propionate | 7 |
| 22 | 10 | 60 | Tris(2,4-diterbutylphenyl) phosphite | 15 |
|    |    |    | Pentaerythrityltetrakis(3,5-diterbutyl-4-hydroxyphenyl)propionate | 15 |
| 23 | 20 | 48 | Tris(2,4-diterbutylphenyl) phosphite | 16 |
|    |    |    | Stearyl(3,5-diterbutyl-4-hydroxyphenyl)prioponate | 16 |

EXAMPLE 24

Using the same procedure described in example 7, a rubbery product is obtained which is not greasy to the touch, composed of 45 parts of polybutylene and 55 parts of UVASIL 299 LM.

EXAMPLES 25–27

The following examples were carried out to show that there was no chemical reaction between the polymer and the UVASIL 299 LM.

For this purpose, the products obtained from experiments 1, 7 and 10, were extracted with soxhlet for 15 hours using hexane as an extracting solvent.

After removing the solvent under vacuum, the product was recovered and weighed.

The results obtained are shown in Table 3.

TABLE 3

| Example | Extracted Product | $\dfrac{\text{Recovered UVASIL 299 LM}}{\text{Expected Quantity}} \times 100$ |
|---------|-------------------|-------|
| 25 | Ex. 1 | 99 |
| 26 | Ex. 7 | 97 |
| 27 | Ex. 10 | 95.5 |

EXAMPLES 28–30

Using the same procedure described in examples 1–7, products were prepared using UVASIL 299 instead of UVASIL 299 LM.

UVASIL 299 is composed of a 50/50 blend of cyclic products having general formula (V) and linear products having general formula (VI) and has an average osmometric molecular weight of 1800 Da.

Table 4 shows the results obtained which refer to the maximum quantity of product which it is possible to blend with polypropylene to obtain a flowing solid product which is not greasy to the touch.

The maximum quantity of UVASIL 299 which it is possible to blend with polypropylene (PP) is lower than that of the corresponding examples 1, 3 and 4 obtained by adding UVASIL 299 LM to the same type of polypropylene.

TABLE 4

| Ex. | PP | UVASIL 299 % |
|---|---|---|
| 28 | MOPLEN FLF 20 | 50 |
| 29 | MOPLEN FLX 30S | 55 |
| 30 | MOPLEN FLD 50S | 60 |

We claim:

1. A solid stabilizer for polymers which comprises a blend of (a) 60 to 10% by weight of an organic polymer and (b) 40 to 90% by weight, based on the final solid blend, of a mixture of a cyclic silicon-containing compound and a linear silicon-containing compound as a stabilizer; with the cyclic compound having the formula (I) and the linear compound having the formula (II):

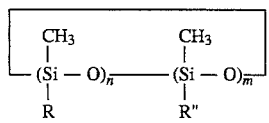
(I)

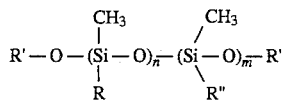
(II)

where R is:

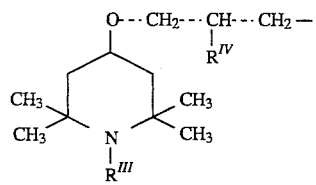

with $R^{III}$ being a hydrogen atom or a methyl group, $R^{IV}$ being a hydrogen atom or a $C_1$–$C_5$ linear or branched alkyl group; where R' is a hydrogen atom, a

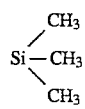

group of a $C_1$–$C_{12}$ linear or branched alkyl group; where R" is a $C_1$–$C_{18}$ linear or branched alkyl group, or is selected from the group consisting of:

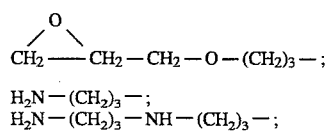

$H_2N-(CH_2)_3-$;
$H_2N-(CH_2)_3-NH-(CH_2)_3-$;

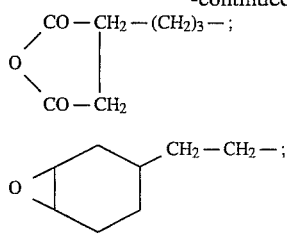

where the total of m+n is between 4 and 50; and where m is 0 or an integer between 1 and 15.

2. A solid stabilizer according to claim 1, wherein the silicon-containing compounds are a mixture of a cyclic product having the following general formula (V) and a linear product having the general formula (VI):

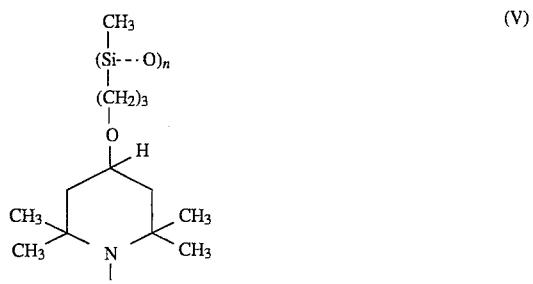
(V)

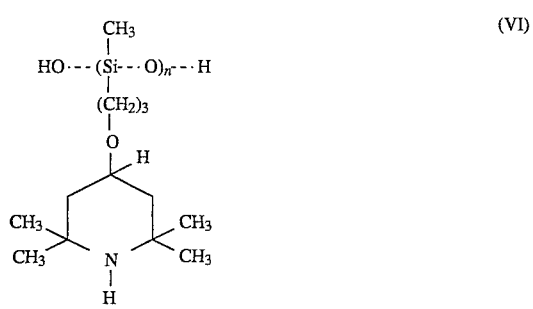
(VI)

where n is a value sufficient to provide an average molecular weight of between 1100 and 10000 Dalton.

3. A polymer composition which comprises (a) an organic polymer and (b) the solid stabilizer according to claim 1.

4. A solid stabilizer according to claim 3, wherein the blend of silicon-containing compound(s) contains 90% by weight of the cyclic product of general formulae V with an average molecular weight of 1100 Dalton and a density of 1.02 g/cc.

5. A polymer composition according to claim 3, wherein the organic polymer is an olefinic polymer.

6. A polymer composition according to claim 5, wherein the olefinic polymer is selected from the group consisting of polypropylene, high and low density polyethylene, polybutylene, and polystyrene.

7. Process for preparing a solid stabilizer for polymers which comprises a blend of (a) 60 to 10% by weight of an organic polymer and (b) 40 to 90% by weight, based on the final solid blend, of a mixture of a cyclic silicon-containing compound and a linear silicon-containing compound as a stabilizer; with the cyclic compound having the formula (I) and the linear compound having the formula (II):

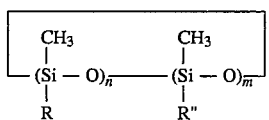 (I)

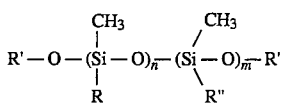 (II)

where R is:

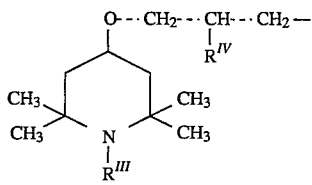

$R^{III}$ being a hydrogen atom or a methyl group, $R^{IV}$ being a hydrogen atom or a $C_1$–$C_5$ linear or branched alkyl group; where R' is a hydrogen atom, a

group or a $C_1$–$C_{12}$ linear or branched alkyl group; where R" is a $C_1$–$C_{18}$ linear or branched alkyl group, or is selected from the group consisting of:

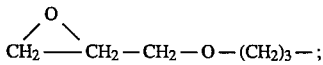

$H_2N-(CH_2)_3-$;
$H_2N-(CH_2)_3-NH-(CH_2)_3-$;

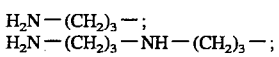

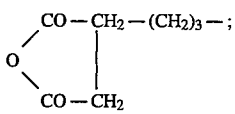

where the total of m+n is between 4 and 50; and where m is 0 or an integer between 1 and 15, which comprises the steps of (a) introducing the organic polymer and mixture of the silicon-containing compounds into a reactor, (b) melting the blend at a temperature of between 170° C. and 280° C. while stirring the blend for a time sufficient to ensure complete homogenization, (c) percolating the melted and homogenized blend on a cold roll, and then (d) reducing the blend to the required physical form.

8. Process for preparing the solid stabilizer according to claim 7, which comprises the steps of (a) dissolving the organic polymer and the silicon-containing compounds in a solvent and (b) subsequently removing the solvent under vacuum at a temperature of between 100° C. and 120° C. and a pressure of 0.1 torr.

9. Process for preparing a solid stabilizer according to claim 8, wherein the solvent is selected from the group consisting of toluene, heptane, and chloroform.

10. Process for preparing the solid stabilizer according to claim 7, which comprises feeding the organic polymer and the silicon-containing compounds in the required amounts into an extruder having two different screw stages and then cutting the extruded blend into pellets.

11. A solid stabilizer according to claim 1, further comprising a polymer additive selected from the group consisting of:

thermal stabilizers;

UV stabilizers;

lubricants;

finely sub-divided inorganic pigments;

organic dyes; and mixtures thereof.

12. Process for preparing the solid stabilizer according to claim 11, which comprises the steps of melting the organic polymer and the silicon-containing compounds and then adding the polymer additive.

13. A polymer composition according to claim 6, wherein the polyethylene is a low density linear polyethylene.

14. Process for preparing a solid stabilizer according to claim 7, wherein the melted blend is stirred for 10 to 120 minutes.

* * * * *